US010594574B2

(12) United States Patent
Wu et al.

(10) Patent No.: US 10,594,574 B2
(45) Date of Patent: Mar. 17, 2020

(54) MIDDLEBOX MODELING

(71) Applicant: HEWLETT PACKARD ENTERPRISE DEVELOPMENT LP, Houston, TX (US)

(72) Inventors: Wenfei Wu, Palo Alto, CA (US); Ying Zhang, Palo Alto, CA (US); Sujata Banerjee, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 152 days.

(21) Appl. No.: 15/345,123

(22) Filed: Nov. 7, 2016

(65) Prior Publication Data
US 2018/0131621 A1  May 10, 2018

(51) Int. Cl.
H04L 12/26 (2006.01)
H04L 29/08 (2006.01)
H04L 12/24 (2006.01)

(52) U.S. Cl.
CPC .......... H04L 43/028 (2013.01); H04L 41/145 (2013.01); H04L 67/1004 (2013.01)

(58) Field of Classification Search
None
See application file for complete search history.

(56) References Cited

U.S. PATENT DOCUMENTS 8,875,110 B2 * 10/2014 Lee ..................... G06F 11/3604
717/142
9,262,253 B2    2/2016 Jain et al.
2012/0233599 A1 * 9/2012 Valdiviezo Basauri .. G06F 8/41
717/126
2013/0247015 A1 * 9/2013 Abadi ................. G06F 11/3612
717/132
2014/0229945 A1 * 8/2014 Barkai .................... H04L 49/70
718/1
2015/0135166 A1 * 5/2015 Tarlow ...................... G06F 8/34
717/125
2015/0169295 A1 * 6/2015 Kyoso ...................... G06F 8/34
717/109
2015/0172208 A1 * 6/2015 DeCusatis ............... H04L 47/70
709/226
2015/0193622 A1 * 7/2015 Burrell ................... G06F 21/54
726/25

(Continued)

OTHER PUBLICATIONS

"Model Checking for Dynamic Datapaths"; Feb. 1, 2014; 14 pages.

(Continued)

*Primary Examiner* — Gregory B Sefcheck
*Assistant Examiner* — Suk Jin Kang
(74) *Attorney, Agent, or Firm* — Hewlett Packard Enterprise Patent Department

(57) ABSTRACT

In some examples, a method includes parsing, by a network device, a section of source code associated with a network function provided by a middlebox in a network; extracting, by the network device, a packet processing slice and a state transition slice from the section of source code; generating, by the network device, a plurality of execution paths from the packet processing slice and the state transition slice; and modeling the middlebox by inserting, by the network device, the plurality of execution paths to a match-action table that describes a packet processing model for the middlebox.

16 Claims, 10 Drawing Sheets

(56) References Cited

U.S. PATENT DOCUMENTS

| | | | | |
|---|---|---|---|---|
| 2015/0347129 | A1* | 12/2015 | Chittimalli | G06F 8/73 717/123 |
| 2015/0355904 | A1* | 12/2015 | Koreki | G06F 8/33 717/123 |
| 2016/0149788 | A1* | 5/2016 | Zhang | H04L 43/10 709/224 |
| 2016/0274951 | A1* | 9/2016 | Koizumi | G06F 9/50 |
| 2017/0063690 | A1* | 3/2017 | Bosshart | H04L 45/7457 |
| 2017/0064047 | A1* | 3/2017 | Bosshart | H04L 69/22 |
| 2017/0134481 | A1* | 5/2017 | DeCusatis | H04L 67/1002 |
| 2017/0185504 | A1* | 6/2017 | Krishnan | G06F 11/3604 |
| 2017/0371629 | A1* | 12/2017 | Chacko | G06F 8/36 |
| 2018/0077037 | A1* | 3/2018 | Zhang | H04L 43/0817 |
| 2018/0081794 | A1* | 3/2018 | Ramdas | G06F 17/2247 |

OTHER PUBLICATIONS

Brendan Tschaen, et al ; SFC-Checker: Checking the Correct Forwarding Behavior of Service Function Chaining; IEEE NFV-SDN, Nov. 2016.

Melazzi,N.B. et al.; "Superfluidity a Super-fluid, Cloud-native, Converged Edge System"; Jul. 1, 2016.

Panda, A. et al.; "Verifying Reachability in Networks with Mutable Datapaths"; Jul. 4, 2016; 14 pages.

Stoenescu, R. et al.; "SymNet: Static Checking for Stateful Networks"; Dec. 9, 2013; 6 pages.

Fayaz et al., "Buzz: Testing context-dependent policies in stateful networks". 13th USENIX Symposium on Networked Systems Design and Implementation, In Proc. NSDI, 2016, 16 pages.

Jacobson et al., "Opennf: Enabling innovation in network function control", In Proceedings of the 2014 ACM Conference on SIGCOMM, SIGCOMM '14, 2014, 12 pages.

Joseph et al., "Modeling middleboxes," IEEE Network, 2008, pp. 20-25.

Kazemian et al., "Header Space Analysis: Static Checking For Networks", In Proceedings of the 9th USENIX Symposium on Networked Systems Design and Implementation, Apr. 2012, 14 pages.

Kazemian et al., "Real Time Network Policy Checking using I-leader Space Analysis", In Proceedings of the 10th USENIX Symposium on Networked Systems Design and Implementation, Apr. 2013, pp. 99-112.

Khalid et al., "Paving the Way for NFV: Simplifying Middlebox Modifications using StateAlyzr", 2016, 16 pages.

Khurshid et al., "Veriflow: verifying network-wide invariants in real time", ACM SIGCOMM Computer Communication Review, vol. 42, Issue 4, Oct. 2012, pp. 467-472.

Moshref et al., "Flow-level State Transition as a New Switch Primitive for SDN", SIGCOMM'14, Aug. 17-22, 2014, pp. 377-378.

Panda et al., "Verifying Isolation Properties in the Presence of Middleboxes", 2014, 14 pages.

Rajagopalan et al., "Split/merge: System support for elastic execution in virtual middleboxes". In Proceedings of the 10th USENIX Conference on Networked Systems Design and Implementation, 2013, 14 pages.

Stoenescu et al., "Scalable symbolic execution for modern networks". In Proc. ACM SIGCOMM, 2016, 13 pages.

* cited by examiner

```
1   from scapy.all import *
2   # Constants
3   ROUND_ROBIN = 1
4   MTU = 1500
5   # Configurations
6   mode = ROUND_ROBIN
7   LB_IFACE = "eth0"
8   LB_IP, LB_PORT = "3.3.3.3" , 80
9   servers = [("1.1.1.1", 80), ("2.2.2.2", 80)]
10  # Output-Impacting States
11  f2b_nat, b2f_nat = {}, {}
12  rr_idx = 0
13  cur_port = 10000
14  # Log States
15  pass_stat, drop_state = 0, 0
16  # variable format (cs|sc)_(f|b)(s|d)(i|p|rpl): sc|cs is
    direction between client and server, f|b is a side of
    frontend/backend, s|d is source/destination and i|p|rpl
    is IP address, port number or 4-tuple.
17  def pkt_callback(pkt):
18      global drop_stat, pass_stat, rr_idx, cur_port
19      si, di = pkt[IP].src, pkt[IP].dst
20      sp, dp = pkt[TCP].sport, pkt[TCP].dport
21      if dp == LB_PORT: # pkt from client to server
22          cs_ftpl, sc_ftpl = (si, sp, di, dp), (di, dp, si, sp)
23          if cs_ftpl not in f2b_nat: # new connection
24              if mode == ROUND_ROBIN:
25                  server = servers[rr_idx]
26                  rr_idx = (rr_idx + 1) % len(servers)
27              else: # Hash to a backend server
28                  server = servers[hash(si) % len(servers)]
29              n_port = cur_port
30              cur_port += 1
31              cs_btpl = (LB_IP, n_port, server[0], server[1])
32              sc_btpl = (server[0], server[1], LB_IP, n_port)
33              f2b_nat[cs_ftpl], f2b_nat[sc_btpl] = cs_btpl, sc_ftpl
34              nat_tpl = cs_btpl
35          else: # existing connection
36              nat_tpl = f2b_nat[cs_ftpl]
37      else: # pkt from server to client
38          sc_btpl = (si, sp, di, dp)
39          if sc_btpl in b2f_nat:
40              nat_tpl = b2f_nat[sc_btpl]
41          else: # no initial outbound traffic is allowed
42              drop_stat += 1
43              return
44      pass_stat += 1
45      pkt[IP].src, pkt[TCP].sport = nat_tpl[0], nat_tpl[1]
46      pkt[IP].dst, pkt[TCP].dport = nat_tpl[2], nat_tpl[3]
47      for f in fragment(pkt[IP], fragsize = MTU-len(Ether())):
48          sendp(Ether()/f, iface = LB_IFACE)
49  def LoadBalancer():
50      sniff(iface=LB_IFACE, prn=pkt_callback, filter='tcp')
51  if __name__ == "__main__":
52      LoadBalancer()
```

BACKWARD SLICING 280

*FIG. 2*

```
1   from scapy.all import *
2   # Constants
3   ROUND_ROBIN = 1
4   MTU = 1500
5   # Configurations
6   mode = ROUND_ROBIN
7   LB_IFACE = "eth0"
8   LB_IP, LB_PORT = "3.3.3.3", 80
9   servers = [("1.1.1.1", 80), ("2.2.2.2", 80)]
10  # Output-Impacting States
11  f2b_nat, b2f_nat = {}, {}
12  rr_idx = 0
13  cur_port = 10000
14  # Log States
15  pass_stat, drop_state = 0, 0
16  # variable format {cs|sc}_{f|b}{s|d}{i|p|tpl}: sc|cs is
    direction between client and server, f|b is a side of
    frontend/backend, s|d is source/destination and i|p|tpl
    is IP address, port number or 4-tuple.
17  def pkt_callback(pkt):
18      global drop_stat, pass_stat, rr_idx, cur_port
19      si, di = pkt[IP].src, pkt[IP].dst
20      sp, dp = pkt[TCP].sport, pkt[TCP].dport
21      if dp == LB_PORT: # pkt from client to server
22          cs_ftpl, sc_ftpl = (si, sp, di, dp), (di, dp, si, sp)
23          if cs_ftpl not in f2b_nat: # new connection
24              if mode == ROUND_ROBIN:
25                  server = servers[rr_idx]
26                  rr_idx = (rr_idx + 1) % len(servers)
27              else: # Hash to a backend server
28                  server = servers[hash(si) % len(servers)]
29              n_port = cur_port
30              cur_port += 1
31              cs_btpl = (LB_IP, n_port, server[0], server[1])
32              sc_btpl = (server[0], server[1], LB_IP, n_port)
33              f2b_nat[cs_ftpl], b2f_nat[sc_btpl] = cs_btpl, sc_ftpl
34              nat_tpl = cs_btpl
35          else: # existing connection
36              nat_tpl = f2b_nat[cs_ftpl]
37      else: # pkt from server to client
38          sc_btpl = (si, sp, di, dp)
39          if sc_btpl in b2f_nat:
40              nat_tpl = b2f_nat[sc_btpl]
41          else: # no initial outbound traffic is allowed
42              drop_stat += 1
43              return
44      pass_stat += 1
45      pkt[IP].src, pkt[TCP].sport = nat_tpl[0], nat_tpl[1]
46      pkt[IP].dst, pkt[TCP].dport = nat_tpl[2], nat_tpl[3]
47      for f in fragment(pkt[IP], fragsize = MTU-len(Ether())):
48          sendp(Ether()/f, iface = LB_IFACE)
49  def LoadBalancer():
50      sniff(iface=LB_IFACE, prn=pkt_callback, filter='tcp')
51  if __name__ == "__main__":
52      LoadBalancer()
```

— 310 (lines 7–20)
— 320 (lines 21–36)
— 330 (lines 37–48)

*FIG. 3*

```
7    LB_IFACE = "eth0"
8    LB_IP, LB_PORT = "3.3.3.3" , 80
9    servers = [("1.1.1.1", 80), ("2.2.2.2", 80)]
10   # Output-Impacting States
11   f2b_nat, b2f_nat = {}, {}
12   rr_idx = 0
13   cur_port = 10000
14   # Log States
15   pass_stat, drop_state = 0, 0
16   # variable format (cs|sc)_(f|b)(s|d)(i|p|rpl): sc|cs is
     direction between client and server, f|b is a side of
     frontend/backend, s|d is source/destination and i|p|rpl
     is IP address, port number or 4-tuple.
17   def pkt_callback(pkt):
18       global drop_stat, pass_stat, rr_idx, cur_port
19       si, di = pkt[IP].src, pkt[IP].dst
20       sp, dp = pkt[TCP].sport, pkt[TCP].dport
21       if dp == LB_PORT: # pkt from client to server
22           cs_ftpl, sc_ftpl = (si, sp, di, dp), (di, dp, si, sp)
23           if cs_ftpl not in f2b_nat: # new connection
24               if mode == ROUND_ROBIN:
25                   server = servers[rr_idx]
26                   rr_idx = (rr_idx + 1) % len(servers)
27               else: # Hash to a backend server
28                   server = servers[hash(si) % len(servers)]
29               n_port = cur_port
30               cur_port += 1
31               cs_btpl = (LB_IP, n_port, server[0], server[1])
32               sc_btpl = (server[0], server[1], LB_IP, n_port)
33               f2b_nat[cs_ftpl], f2b_nat[sc_btpl] = cs_btpl, sc_ftpl
34               nat_tpl = cs_btpl
44       pass_stat += 1
45       pkt[IP].src, pkt[TCP].sport = nat_tpl[0], nat_tpl[1]
46       pkt[IP].dst, pkt[TCP].dport = nat_tpl[2], nat_tpl[3]
```

*FIG. 4A*

```
7     LB_IFACE = "eth0"
8     LB_IP, LB_PORT = "3.3.3.3" , 80
9     servers = [("1.1.1.1", 80), ("2.2.2.2", 80)]
10    # Output-Impacting States
11    f2b_nat, b2f_nat = {}, {}
12    rr_idx = 0
13    cur_port = 10000
14    # Log States
15    pass_stat, drop_state = 0, 0
16    # variable format (cs|sc)_(f|b)(s|d)(i|p|rpl): sc|cs is
      direction between client and server, f|b is a side of
      frontend/backend, s|d is source/destination and i|p|rpl
      is IP address, port number or 4-tuple.
17    def pkt_callback(pkt):
18        global drop_stat, pass_stat, rr_idx, cur_port
19        si, di = pkt[IP].src, pkt[IP].dst
20        sp, dp = pkt[TCP].sport, pkt[TCP].dport
21        if dp == LB_PORT: # pkt from client to server
22            cs_ftpl, sc_ftpl = (si, sp, di, dp), (di, dp, si, sp)
23            if cs_ftpl not in f2b_nat: # new connection
37        else: # pkt from server to client
38            sc_btpl = (si, sp, di, dp)
39            if sc_btpl in b2f_nat:
40                nat_tpl = b2f_nat[sc_btpl]
41            else: # no initial outbound traffic is allowed
42                drop_stat += 1
43                return
44        pass_stat += 1
45        pkt[IP].src, pkt[TCP].sport = nat_tpl[0], nat_tpl[1]
46        pkt[IP].dst, pkt[TCP].dport = nat_tpl[2], nat_tpl[3]
```

*FIG. 4B*

MATCH-ACTION TABLE
500

| MATCH 510 | | ACTION 520 | |
|---|---|---|---|
| FLOW 530 | STATE 540 | FLOW 550 | STATE 560 |
| | | EXECUTION PATH 1 570 | |
| | | EXECUTION PATH 2 580 | |
| | | ... ... | |

*FIG. 5*

MIDDLEBOX MODELING

BACKGROUND

Network middleboxes are difficult to manage and troubleshoot due to their proprietary monolithic design. Moving towards Network Functions Virtualization (NFV), the virtualized appliances can be flexibly instantiated and dynamically chained, which makes troubleshooting middleboxes more difficult. To provide carrier-grade availability and reduce outages, operators attempt to verify that the automatically deployed network and middlebox configurations obey high-level network policies. Such network verification involves the modeling of middleboxes. A challenge while performing verification for network functions (NFs) and their service chains is the lack of middlebox models. NFs maintain states about each connection and perform different actions based on the states. The states also vary depending on the type of NF being verified. For example, a firewall tracks a Transmission Control Protocol (TCP) connection state, whereas a Deep Packet Inspection (DPI) tracks application payload. Currently, no abstraction to model disparate state for individual flows (or connections) for service function chaining (SFC) verification exists.

BRIEF DESCRIPTION OF THE DRAWINGS

The following detailed description references the drawings, wherein:

FIG. 2 is a block diagram illustrating a parsing technique used in an example middlebox modeling;

FIG. 3 is a block diagram illustrating packet processing slices and state transition slices used in an example middlebox modeling;

FIGS. 4A-4B are block diagrams illustrating execution paths used in an example middlebox modeling;

FIG. 5 is a block diagram illustrating a match-action table used in an example middlebox modeling;

DETAILED DESCRIPTION

To address the challenges mentioned above, the solution herein involves a method to automatically extract abstract model for NFs that encodes an NF's behavior into a set of actions and states. Moreover, the abstract model of middleboxes allows for representing an NF by modeling the temporal relationship between states. In particular, the system can construct such an abstract model by refactoring the middlebox source code using a tool called VNFactor. The VNFactor can automatically construct the model from source code analysis. An example use of VNFactor on an open source NF, a load balancer, is demonstrated in this disclosure.

Architecture

Figure 1:
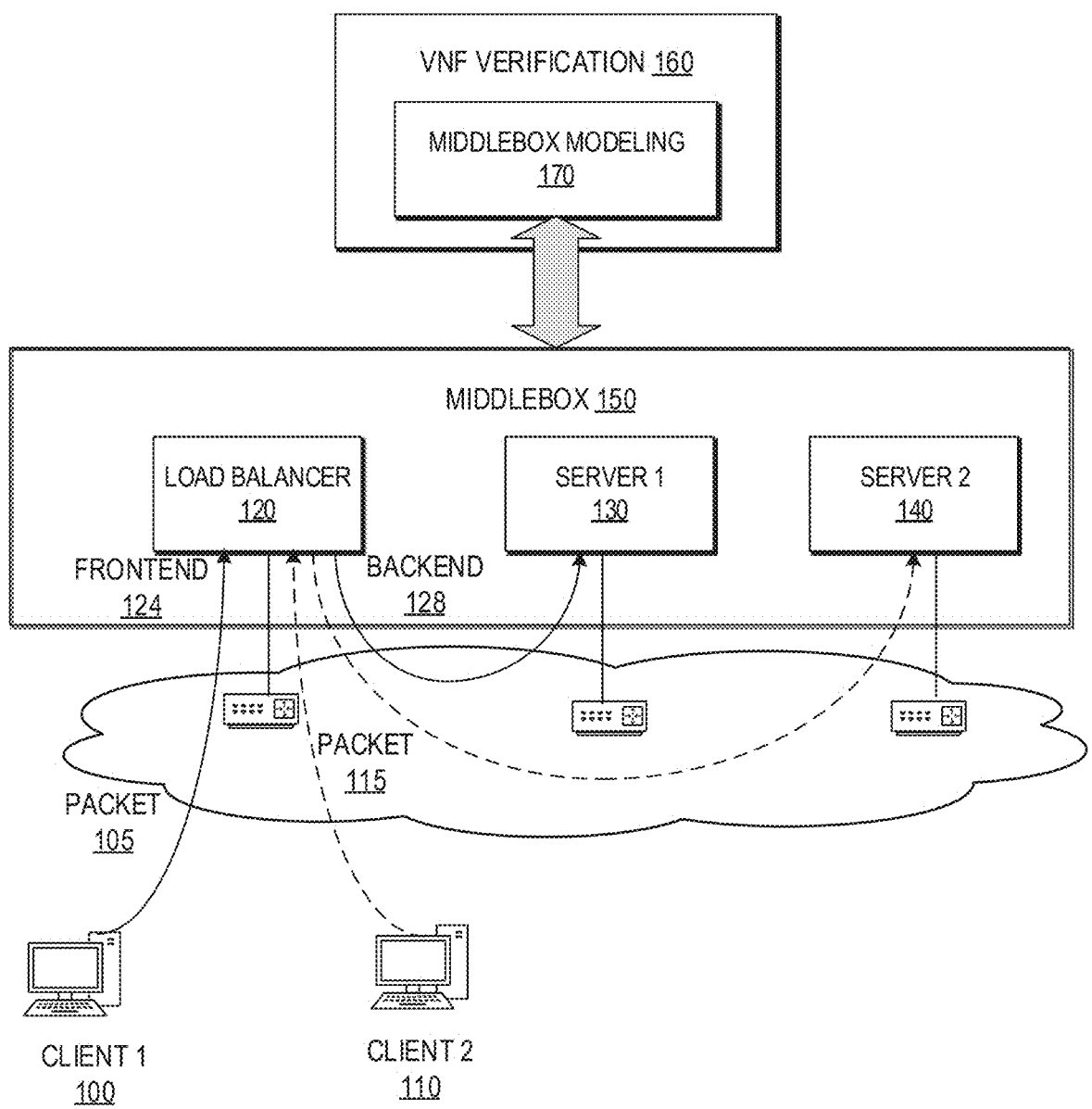
FIG. 1 is a block diagram of an example architecture for middlebox modeling.

FIG. 1 is a block diagram of an example architecture for middlebox modeling. Specifically, FIG. 1 includes a middlebox 150 that includes at least a virtualized network function, such as, load balancer 120, and a plurality of hardware networking devices, such as server 1 130 and server 2 140. In this disclosure, middlebox (e.g., middlebox 150 in FIG. 1) is used interchangeably with the term virtualized network function (VNF), which generally refers to a software implementation to handle specific network functions that run in at least one virtual machine on top of the hardware networking infrastructure, which can include routers, switches, servers, cloud computing systems, etc.

In the example deployment scenario of a layer-4 load balancer in FIG. 1, load balancer 120 provides services to multiple clients (e.g., client 1 100 and client 2 110) via a frontend interface 124 and connects to multiple servers (e.g., server 1 130 and server 2 140) via a backend interface 128.

Moreover, FIG. 1 also includes a VNF verification module 160 that has a middlebox modeling component 170. VNF verification module 160 can verify network reachability properties and detect configuration errors. Besides verifying basic connectivity invariants, such as, loop free-ness, isolation, and reachability, VNF verification module 160 may also be used to verify performance metrics by a VNF, such as, latency, packet loss rate, bandwidth, availability, etc.

Middlebox modeling component 170 can construct an abstract middlebox model for a variety of middleboxes, such as, firewalls, injection detection system (IDS), load balancers, etc. In particular, middlebox modeling component 170 can maintain the NF states of each connection and perform different actions based on the NF states. Note that the NF states may vary depending on the type of NFs being verified. For example, a firewall tracks Transmission Control Protocol (TCP) connection states, whereas a Deep Packet Inspection (DPI) tracks application payload states. However, the abstract model constructed by middlebox modeling component 170 can represent different kinds of NF states and actions, and thus is generally applicable to most VNFs.

Specifically, middlebox modeling component 170 can use a tool called VNFactor. VNFactor may adopt an OpenFlow style model with stateful data plane extension. The abstract model may be expressed as a match-action table that is used to describe the packet processing logic under a certain configuration. As a stateful data plane, the match fields and the action fields in the match-action table operate on both flows and states. The match is executed on flows and states, and the action not only forwards packets with possible transformation, but also triggers transition between the states.

In the example illustrated in FIG. 1, during operations, load balancer 120 can receive inbound packets, e.g., packet 105 (or packet 115) from a client, such as, client 1 100 (or client 2 110) via its frontend interface 124. The inbound packets have the IP addresses and ports of the clients (e.g., client 1 100 or client 2 110) and load balancer 120, which would be mapped to the IP addresses and ports of load balancer 120 and servers (e.g., server 1 130 and server 2 140). If an inbound packet belongs to a new flow that has not been seen at load balancer 120 before, one of the backend servers (e.g., server 1 130) will be selected for the mapping.

The selection of the backend servers may use any type of load balancing mechanisms. As used herein, the term "mechanism" generally refers to a component of a system or device to serve one or more functions, including but not limited to, software components, electronic components, electrical components, mechanical components, electro-mechanical components, etc.

Next, the backend server mapping for the new flow is stored at middlebox 150. If, on the other hand, the inbound packet belongs to an existing flow, then the mapping is retrieved from a storage at middlebox 150 and used for IP address/port translation.

For the outbound packets, if the packets belong to an existing flow, then the mapping is retrieved from the storage at middlebox 150 and used for IP address/port translation. If, on the other hand, the packets belong to a new flow, the outbound packets of the new flow would be dropped. Therefore, generally, inbound packets can initiate an IP address/port translation mapping, whereas outbound packets cannot initiate the IP address/port translation mapping.

VNF Model Introduction

The example middlebox modeling tool, VNFactor, generally adopts an OpenFlow style model with stateful data plane extension. The abstract model can be expressed as a plurality of match-action tables. Each table describes the packet processing logic under a particular configuration. Each entry in the match-action table represents a particular processing logic, and includes both a plurality of match fields and a plurality of action fields.

As a stateful data plane, the match/action fields operate on both flows and states. The match fields are generally executed on flows and states, whereas the action fields not only indicates forwarding of packets (with possible transformation), but also indicates inter-state transition triggers. For example, if an incoming packet matches flow pattern f1, the internal state is in s1 and a predicate P(f1; s1) is satisfied, then the incoming packet is sent out with possible transformation Fwd(f1; s1) and the internal state is transited to Upd(f1; s1).

Middlebox Model Extraction

The solution described herein can refactor existing middlebox programs and extract the logic that can fit in the above described VNF model. Specifically, VNFactor achieves this in three steps: First, VNFactor can use a state analyzer and use a program slicing technique on the middlebox source code to obtain a packet processing slice and a state transition slice. Second, the intersection of both the packet processing slice and the state transition slice generally becomes the match logic, and the non-intersection parts becomes the packet processing logic and the state transition logic respectively. Then, VNFactor can perform a control flow analysis and symbolic execution to find out possible execution paths in the union of both the packet processing slices and state transition slices. Each execution path then becomes an entry in the match-action tables in the VNFactor model. Finally, the condition statements in each execution path are further refined into flow-matching and state-matching fields in the entry, and the flow action and state transition is obtained by intersecting the execution path and the flow/state slice respectively.

The VNF model not only is useful in code analysis and debugging, but also benefits several existing network verification applications. For example, VNFactor can extract the representative logics of a middlebox program (e.g., a forwarding logic and a state transition logic) so that the symbolic execution can be accelerated. The state transition logic can be used to build a finite state machine, which can be used in network verifications solutions.

VNFactor Algorithm

Table 1 below shows an example VNFactor algorithm using the load balancer example in FIG. 1 and its source code FIG. 2 to illustrate each steps in the VNFactor algorithm.

TABLE 1

Input: prog, Output: table
Identify packet processing slice
for stmt in prog do
   if stmt calls PKT_OUTPUT_FUNC then
      s := BackwardSlice(stmt, Vars(stmt.RHS))
      pktSlice := pktSize u s
Categorize variables
(pktVar, oisVars, cfgVars) := StateAlyzer(pktSlice)
Identify state transition slice
for stmt in prog do
   if Vars(stmt.LHS) in oisVars then
      s := BackwardSlice(stmt, Vars(stmt.LHS))
      stateSlice := stateSlice u s
Find out execution path
execPaths := FindExecPaths(pktSlice u stateSlice)
Refactor logic into model
For p in execPaths do
   cndStmts := GetConditionStatements(p)
   config :=cndStmts ∩ cfgVars
   match := (cndStmts ∩ pktVars, cndStmts ∩ oisVars)
   action := (p ∩ pktSlice, p ∩ stateSlice)
   table[config].add(<match,action>)s The input of the VNFactor is a VNF program and the outputs of the VNFactor are match-action tables that satisfy the VNF model. Here, VNFactor inherits several assumptions and domain knowledge from StateAlyzer. Since the VNF program continuously processes incoming packets, there exists a packet processing loop. The VNF program can use standard library or system functions to exchange packets with the operating system kernel on network devices. Thus, VNFactor can use this knowledge to locate packet read/write statements in the program. Moreover, VNFactor can identify the variable that stores a packet by fetching the return value of packet input function or the argument of packet output function.

A. Parsing Source Code

FIG. 2 is a block diagram illustrating a parsing technique used in an example middlebox modeling. Specifically, FIG. 2 illustrates an example excerpt of source code for the example middlebox 150 as illustrated in FIG. 1. In this source code excerpt of a middlebox implementing a VNF of a load balancer, different configurations would lead to different program behaviors. For example, the variable mode is used to configure how a backend server is selected for a new flow. In one use case, the variable mode can be a round robin mechanism. In another use case, the variable mode can be a random hash mechanism. Moreover, states of the variables are dynamic. This causes the actions on packets to be different at runtime depending on the states of the VNF. In the illustrated example, whether a flow's 4-tuple is stored in the dictionary states may lead to the difference between in the actions on the flow's first packets and on the remaining packets.

Refactoring the logic in a VNF program could benefit VNF verification in many ways. For example, finding out the state update logic helps to build a finite state machine (FSM) of that middlebox. Assembling network-wide FSMs of multiple VNFs can help to find out the network-wide invariant violations. In addition, refactoring VNF logic helps to reduce the number of statements that would lead to a certain behavior (e.g., packet corruption, unexpected drop). This enhancement not only eases manual program analysis, but also speeds up other automated program analysis solutions (e.g., symbolic execution).

In this example source code, each frontend incoming packet would be checked to determine whether the flow has been seen at the middlebox previously (e.g., whether the particular IP address/port translation mapping exist in the dictionary at the middlebox). The result becomes the predicate of flow and states in the match field. Also, the first packet of each new flow triggers IP address and port translation, which will be stored in a dictionary at the middlebox. The IP address and port translation here also indicates a state transition. Further, sendp( ) is an example forwarding action on packets. Other output functions from standard library can be used as the starting point as well.

According to the example VNFactor algorithm shown in Table 1, VNFactor first computes the packet processing slice in the example source code excerpt. VNFactor starts from each packet output function and performs backward slicing. Then, VNFactor returns the union of slices as the packet processing slice. Specifically, VNFactor may start from the example forwarding action sendp( ) in statement 210. Because the input to sendp( ) includes fragment f of pkt[IP], VNFactor will search backwards to look for a statement (e.g., statement 220), in which pkt[IP] appears on the left-hand side of the statement. Because pkt[IP] appears on the left-hand side of statement 220, statement 220 is an assignment to the variable pkt[IP] using variable nat_tpl. Therefore, VNFactor continues to search backward for a statement (e.g., statement 230), in which nat_tpl appears on the left-hand side of the statement. In statement 230, the assignment to the variable nat_tpl is based on the value of variable cs_btpl. Next, VNFactor searches backward for a statement (e.g., statement 240), in which cs_btpl appears on the left-hand side of the statement. In statement 240, the assignment to the variable cs_btpl is based on the value of variables n_port and server[ ]. Therefore, VNFactor can continue performing backward slicing technique 290 as illustrated to look for a statement in which the variable n_port or server[ ] appears on the left-hand side. As a result, VNFactor may find statement 250 for an assignment to the variable n_port and statement 260 for the assignment to the variable server[ ].

B. Categorizing Variables

VNFactor generally categorizes variables in the source code into three categories, namely, packet variables (e.g., pktVar), output-impacting state variables (e.g., oisVar), and configurations variables (e.g., cfgVar). The packet variables generally refer to the variables used to hold a packet received by the middlebox. For example, a buffer may be created by the program, and then the buffer variable may be used to read a packet into the buffer. The configuration variable generally refers to a variable used to store a configuration of the middlebox. The output-impacting state variable generally refers to a variable that impact the output of the program. For example, in a load balancer, in order to select a server using a round robin mechanism, an index variable may be used to indicate the server assignment to a new flow. Such index variable is an example of the output-impacting state variable.

C. Generating Packet Processing Slice and State Transition Slice

FIG. 3 is a block diagram illustrating packet processing slices and state transition slices used in an example middlebox modeling. VNFactor can combine statements identified during the backward slicing 280 from a particular function indicating a forwarding action to generate a packet processing slice (e.g. slice 330 in FIG. 3). The packet processing slice (e.g., slice 330) generally refers to a union of slices identified during backward slicing 280.

Next, VNFactor can compute the state transition slice. Specifically, the VNFactor iterates through statements in the program to look for statements that assigns value to any output-impacting state variable (e.g., oisVar). If an oisVar appears on the left-hand side (LHS) of a statement, the statement is an assignment to that of oisVar. Thus, a backward slice is computed for this state update. Upon completion of backward slicing the program, the VNFactor can generate the state transition slice by computing the union of the individual slices identified during the backward slicing. Note that unlike in the generation of packet processing slice that starts from a standard library function indicating a forwarding action, the backward slicing in identifying state transition slices starts from a statement assigning values to an output-impacting state variable.

D. Finding Execution Paths

FIGS. 4A-4B are block diagrams illustrating execution paths used in an example middlebox modeling. Statements in a program may not be executed every time that the program is run. For example, in a conditional branch, one section may be executed when an if condition is satisfied, whereas a second and different section of code may be executed when the if condition is not satisfied. Thus, VNFactor can break down the statements in a source code into a plurality of execution paths based on the different variable states at runtime. The plurality of execution paths may overlap with each other.

Packet processing slice and state transition slice are basic elements of a VNF program. VNFactor can then find out possible execution paths in the union of both the packet processing slice and the state transition slice using symbolic execution. Symbolic execution generally constrains the value of a variable to a particular range during execution of the source code. For example, before execution of a statement that assigns a value to variable A, A may have any value. However, after execution of the statement that assigns the value to variable A, symbolic execution may limit the value of A to a specific range (e.g., positive integers).

In some examples, the complexity of VNF programs makes symbolic execution unable to complete in tractable time. For example, the number of iterations of a while loop depends on a symbolic variable (e.g., an integer). In this case, static analysis could not determine how many time the loop would be executed. Thus, symbolic execution would try out possible inputs (from INT_MIN to INT_MAX), which causes path explosion.

VNF programs often may not contain input-dependent loops. When they do contain loops, if the loops are bounded, the VNF programs can be rewritten or modified according to the style to remove the loops. In some examples, during the symbolic execution, the number of symbolic variables and their scopes may be constrained in order to reduce the branching space. These techniques can be used in combination to make it feasible to use symbolic execution in exploring execution paths.

E. Filing Middlebox Model

The execution paths are further annotated with the packet processing slice and the state transition slice information. Specifically, each execution path can be a unique entry in the match-action table that describes the middlebox model. On each execution path, the condition statements can be collected. The conjunction of these condition statements can be used as the values to fill the match field in the middlebox model. The intersection of condition conjunction and cfg-Vars can be the middlebox model configurations. The packet-matching and state-matching fields can be computed by intersecting the condition conjunction with the pktVars and oisVars respectively. Similarly, the actions on packets can be computed by intersecting the execution path with the packet processing slices. Moreover, the actions on and states can be computed by intersecting the execution path with the state transition slices.

F. Hidden States

The example middlebox modeling tool VNFactor models VNF behaviors at a packet level. However, a set of VNFs may be developed based on libraries at a higher level than the packet level, such as, a Transmission Control Protocol (TCP) socket or httplib in Python. For example, balance as shown in Table 2 below is another implementation of a layer-4 load balancer.

TABLE 2

```
sockfd = listen (...);
for (;;) {
    cltfd = accept (sockfd, ...);
    server = servers[idx++]; idx %=N;
    if(fork( )) {
        bind(srvfd, ...);
        connect(srvfd, server.serv_addr);
        for (;;) {
            FD_SET(cltfd, &rdfds); FD_SET(srvfd, &rdfds);
            sr = select(..., &rdfds, ...);
            if (FD_ISSET(cktfdm &rdfds((
                read(cltfd, buf, ...), write(srvfd, buf, ...);
            else
                read(cltfd, buf, ...), write(srvfd, buf, ...);
} } }
```

The code in Table 2 accepts TCP connections from clients, chooses a backend server, and then forks itself and creates a TCP connection to the server. Then, in the forked process, balance relays traffic between the clients and the servers.

This type of VNFs has states not shown in the VNF programs, but hidden in the operating system. Moreover, these hidden states influence packet processing outcomes. For example, each TCP connection has its own state transition diagram, which includes states, such as, LISTEN, SYN_RCVD, SYN_SENT, etc. Also, data packets received without establishing the three-way handshake first would be dropped.

Analyzing the VNF program code itself does not capture these stateful behaviors. Thus, when handling such higher level libraries, the VNFactor can fall back to the packet-level operations by unfolding these wrapped-up functions (e.g., listen( ), connect( ) etc.). In particular, VNFactor can replace these functions and system calls with packet-level operations together with the TCP state transition. Then, VNFactor can be applied to TCP-terminated VNFs.

G. Code Structure

Code structure can present another challenge to apply VNFactor. There are generally four types of code structures for VNF programming. The first type of code structure is shown in Table 3 and it includes one processing loop.

TABLE 3

```
def MainLoop( ):
    while True:
        pkt = Read(IFACE)
        Process(pkt, state)
        Send(pkt)
MainLoop( )
```

The second type of code structure is shown in Table 4 and involves a loop with callback.

TABLE 4

```
def Callback(pkt):
    Process (pkt, state)
    Send(pkt)
sniff(IFACE, Callback)
```

The third type of code structure is shown in Table 5 and includes consumer-producer loops.

TABLE 5

```
def ReadLp( ):
    pkt = Read(IFACE)
    queue.add(pkt)
def ProcLp( ):
    pkt = queue.pop( )
    Process (pkt, state)
    Send (pkt)
Thread.start(ReadLp)
Thread.start(ProcLp)
```

The second and third types of code structure can be transformed easily into a single processing loop. Thus, VNFactor can be applied to these three types of code structures. Table 6 below shows a fourth type of VNF program structure with nested loops. The outer loop processes the first few control packets of a flow (e.g., a TCP connection), while the inner loop processes data packets.

TABLE 6

```
def MainLoop( ):
    while True:
        clt = socket.accept( )
        if os.fork( ) == 0
            srv = socket.connect( )
            while True:
                buf = clt.recv( )
                Process(buf, state)
                srv.send(buf)
MainLoop( )
```

In this case, it is difficult for VNFactor to find out a per-packet execution path from the beginning of either outer loop or inner loop. Therefore, the two loops may be executed independently in two processes after fork( ). Thus, the VNFactor may transform this code structure into one single loop format as shown in Table 7. Specifically, the TCP function unfolding techniques may be used to transform the fourth type of code structure. Then, the VNFactor can be applied to refactor the transformed VNF program source code as shown in Table 7.

TABLE 7

```
def MainLoop( ):
    while True:
        pkt = Read(IFACE)
        if state[pkt].tcpState != ESTABLISHED:
            ProcessCtrlMsg(pkt, state)
            Send(pkt)
        else:
            ProcessDataMsg(pkt, state)
            Send(pkt)
MainLoop( )
```

H. Drop Action

In some examples, packet drop in VNF programs may not be specified explicitly. For example, in line 43 of the example VNF program source code excerpt illustrated in FIG. 2, the packet processing procedure returns without performing any actions on the packet. Thus, in the VNFactor model, a low-priority default action can be defined to handle the scenario where no action is performed. In some examples, the default action can be to drop the packet. Moreover, in some examples, if there is no explicit action (e.g., sendp( )) on packets detected in an execution path, the action to the packets can also be a drop action.

Processes to Perform Middlebox Modeling

Figure 6:
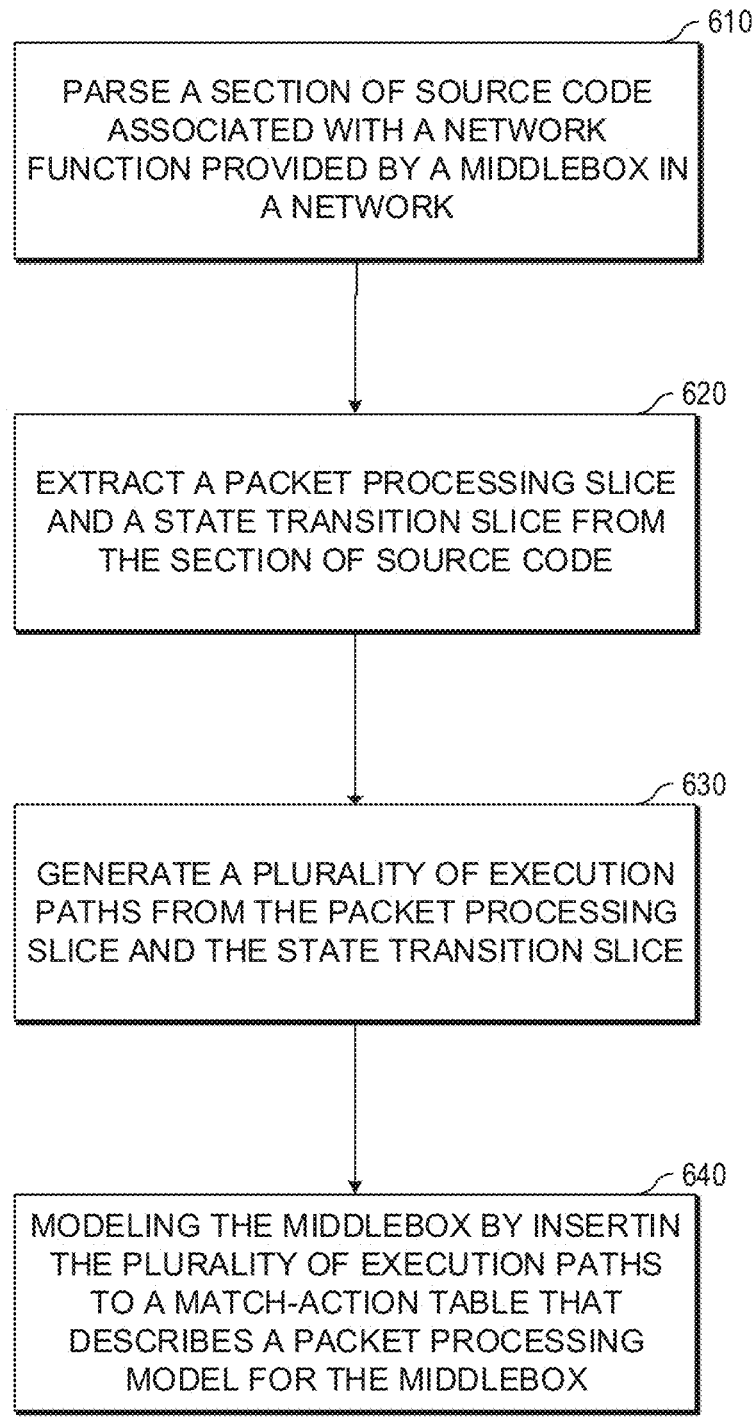
FIG. 6 is a flowchart of an example process of middlebox modeling.
Figure 7:
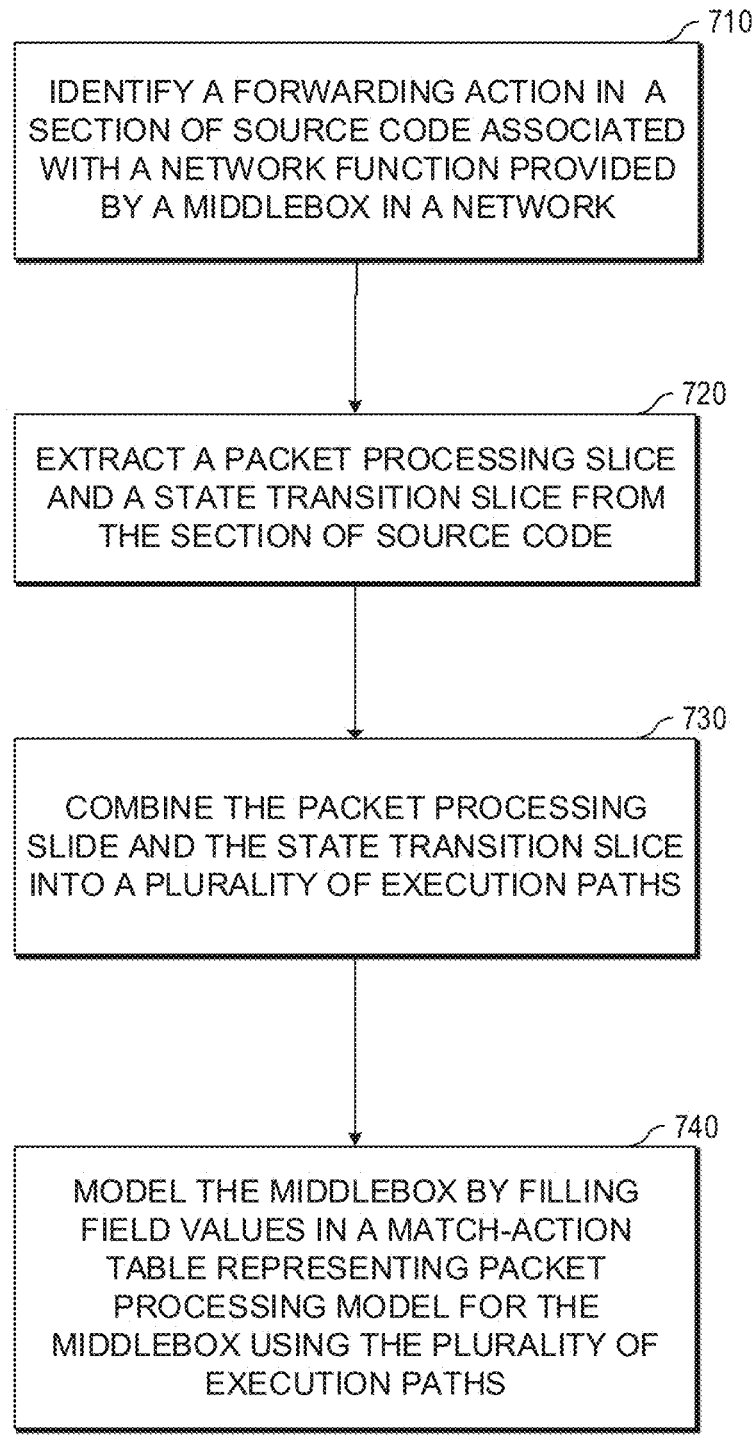
FIG. 7 is a flowchart of an example process of middlebox modeling.
Figure 8:
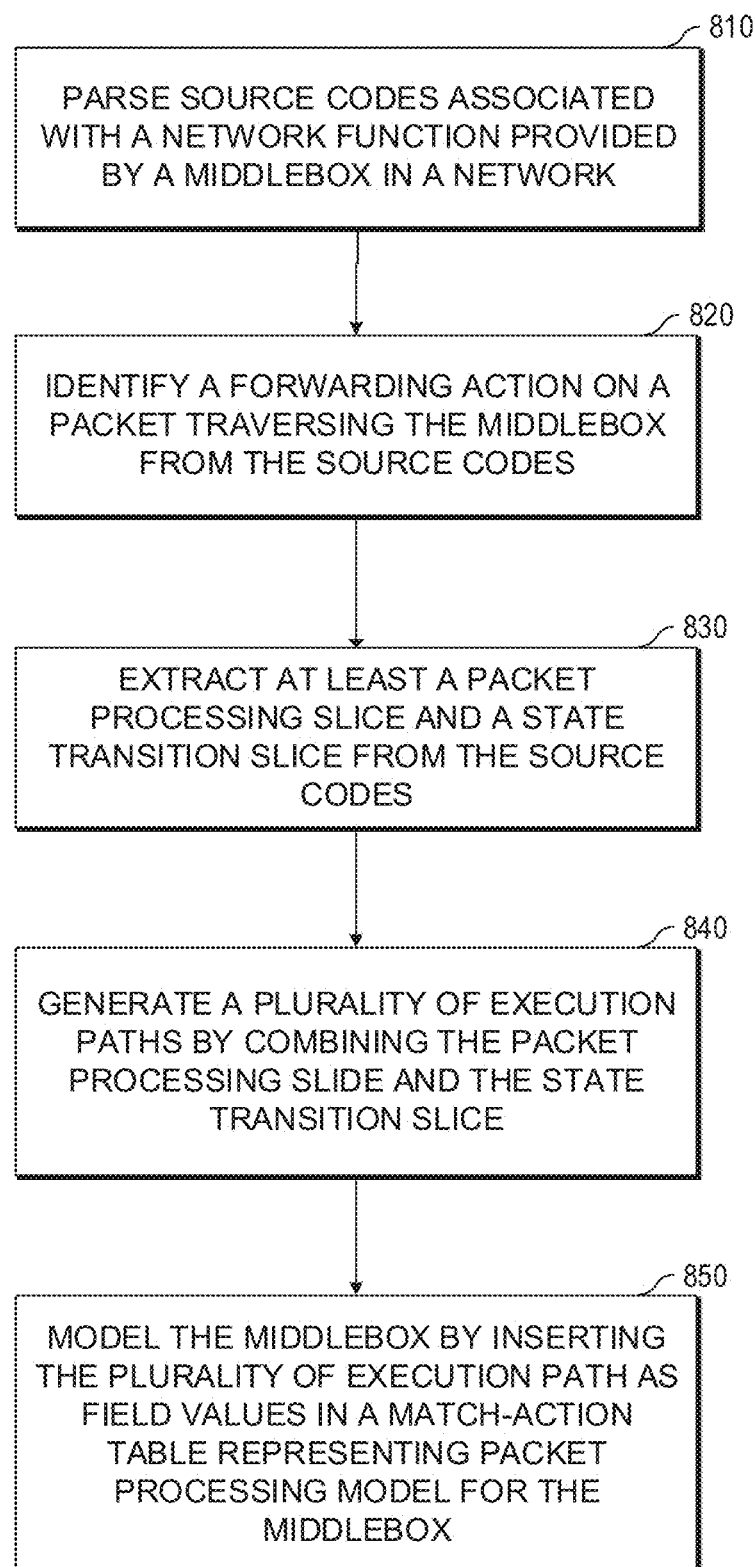
FIG. 8 is a flowchart of an example process of middlebox modeling.

In discussing FIGS. 6-8, references may be made to the components in FIGS. 1-5 to provide contextual examples. In one implementation, VNF verification module 160 and/or middlebox modeling component 170 described in FIG. 1 executes operations 610-640, 710-740, and 810-850 to perform middlebox modeling. Further, although FIGS. 6-8 are described as implemented by a network device, it may be executed on other suitable devices or components. For example, FIGS. 6-8 may be implemented in the form of executable instructions on a machine-readable storage medium or memory 920 as in FIG. 9.

FIG. 6 is a flowchart of an example process of middlebox modeling. First, a network device may parse a section of source code associated with a network function provided by a middlebox in a network (operation 610). Then, the network device can extract a packet processing slice and a state transition slice from the section of source code (operation 620). Next, the network device can generate a plurality of execution paths from the packet processing slice and the state transition slice (operation 630). Finally, the network device can model the middlebox by inserting the plurality of execution paths to a match-action table that describes a packet processing model for the middlebox (operation 640).

FIG. 7 is a flowchart of another example process of middlebox modeling. In this example, the network device first can identify a forwarding action in a section of source code associated with a network function provided by a middlebox in a network (operation 710). Then, the network device can extract a packet processing slice and a state transition slice from the section of source code (operation 720). Further, the network device can combine the packet processing slide and the state transition slice into a plurality of execution paths (operation 730). Then, the network device can model the middlebox by filling field values in a match-action table representing packet processing model for the middlebox using the plurality of execution paths (operation 740).

FIG. 8 is a flowchart of yet another example process of middlebox modeling. Here, the network device first can parse source codes associated with a network function provided by a middlebox in a network (operation 810). Then, the network device can identify a forwarding action on a packet traversing the middlebox from the source codes (operation 820). Next, the network device can extract at least a packet processing slice and a state transition slice from the source codes (operation 830). Also, the network device can generate a plurality of execution paths by combining the packet processing slide and the state transition slice (operation 840). Finally, the network device can model the middlebox by inserting the plurality of execution path as field values in a match-action table representing packet processing model for the middlebox (operation 850).

In some implementations, the network device can receive a packet output function as an input, then perform a backward slicing on the set of source code to obtain a plurality of slices. Furthermore, the network device can generate a packet processing slice by computing a union of the plurality of the slices.

In some implementations, the network device can extract the packet processing slice and the state transition slice by extracting a plurality of variables from the set of source code, categorizing the plurality of variables into a plurality of categories. The plurality of categories may include a packet variable category, an output-impacting state variable category, and a configurations variable category.

In some implementations, the network device can extract the packet slide and the state slice by iterating through a plurality of statements in the section of source code, and computing a backward slice to update a state for each variable of the output-impacting variable category occurring on the left side of a statement. Then, the network device can generate a state transition slice by computing a union of each computed backward slice.

In some examples, a plurality of execution paths may be generated using symbolic execution from the packet processing slice and the state transition slice.

In some examples, the network device can further collect a plurality of condition statements from each execution path. Also, the network device can determine a condition conjunction of the plurality of condition statements. Next, the network device can derive a value for a packet-matching field in the match-action table based on an intersection of the condition conjunction and variables of a packet variable category, and also derive a value for a state-matching field in the match-action table based on an intersection of the condition conjunction and variables of an output-impacting state variable category. In some examples, the network device can derive a value for a packet-action field in the match-action table based on an intersection of an execution path and the packet processing slice. In some examples, the network device can derive a value for a state-action field in the match-action table based on an intersection of the execution path and the state transition slice.

In some examples, the network device can parse the section of source code to identify at least one function indicating an action on a packet passing through the middlebox. Here, the at least one function indicating the action may include, for example, a send function, a receive function, a select function, a read function, and a bind function. In some examples, the network device may parse another section of source code in a library that is associated with the section of source code, wherein the library is not a part of the section of source code.

In some examples, a code structure corresponding to the section of source code may correspond to a single loop format. In other examples, a code structure corresponding to the section of source code may correspond to a nested loop format. In these cases, the network device can transform the section of source code from the nested loop format to a single loop format.

In some implementations, the default forwarding action may be set to a drop action. Specifically, the network device may determine whether the forwarding action exists in the source codes; and if not, the network device may perform a drop action.

Network Device to Perform Middlebox Modeling

Figure 9:
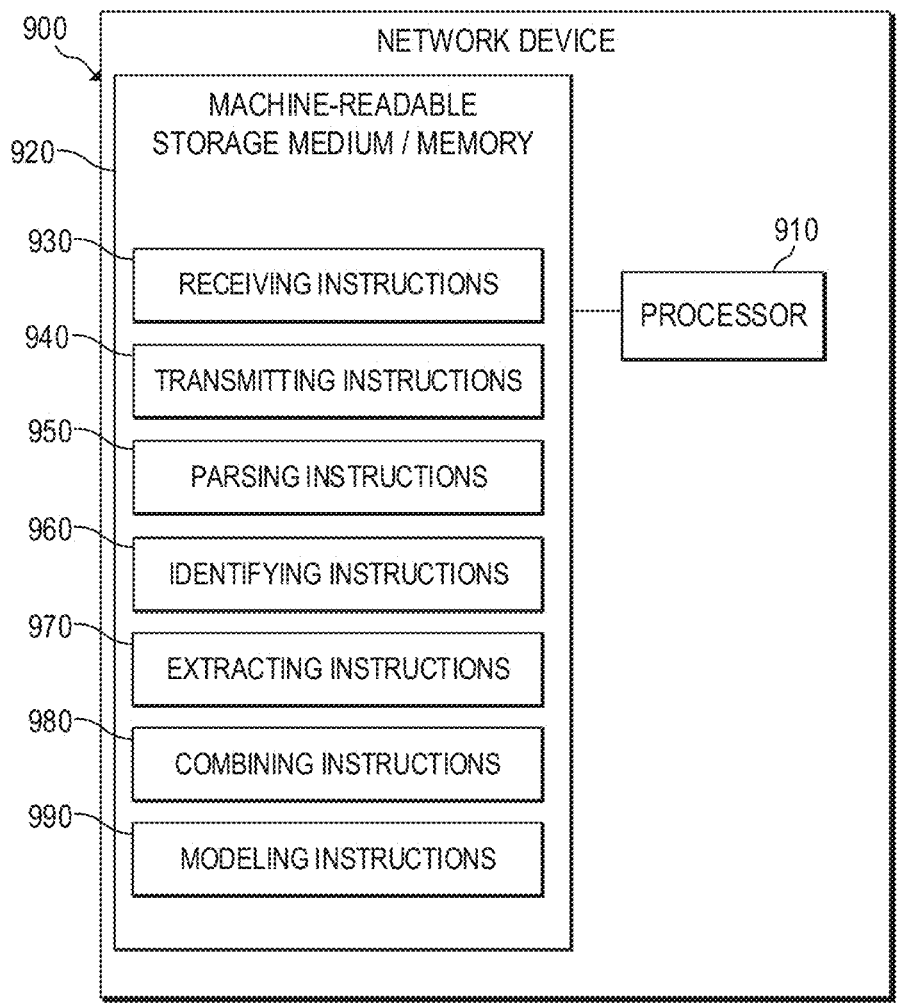
FIG. 9 is a block diagram of an example network device to perform middlebox modeling.

FIG. 9 is a block diagram of an example network device with at least one processor 910 to execute instructions 930-990 within a machine-readable storage medium and/or memory 920 to perform middlebox modeling. As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

Although the network device 900 includes at least one processor 910 and machine-readable storage medium and/or memory 920, it may also include other components that would be suitable to one skilled in the art. For example, network device 900 may include an additional processing component and/or storage. In another implementation, the network device executes instructions 930-990. Network device 900 is an electronic device with the at least one processor 910 capable of executing instructions 930-990, and as such implementations of network device 900 include a mobile device, server, data center, networking device, client device, computer, or other type of electronic device capable of executing instructions 930-990. The instructions 930-990 may be implemented as methods, functions, operations, and other processes implemented as machine-readable instructions stored on the storage medium and/or memory 920, which may be non-transitory, such as hardware storage devices (e.g., random access memory (RAM), read only memory (ROM), erasable programmable ROM, electrically erasable ROM, hard drives, and flash memory).

The at least one processor 910 may fetch, decode, and execute instructions 930-990 to perform middlebox modeling. Specifically, the at least one processor 910 executes instructions 930-990 to: parse a section of source code associated with a network function provided by a middlebox in a network; extract a packet processing slice and a state transition slice from the section of source code; generate a plurality of execution paths from the packet processing slice and the state transition slice; modeling a middlebox by inserting a plurality of execution paths to a match-action table that describes a packet processing model for the middlebox; receive a packet output function as an input; perform a backward slicing on the set of source code to obtain a plurality of slices; generate a packet processing slice by computing a union of the plurality of the slices; extract a plurality of variables from the set of source code; categorize the plurality of variables into a plurality of categories that comprise a packet variable category, an output-impacting state variable category, and a configurations variable category; iterate through a plurality of statements in the section of source code; compute a backward slice to update a state for each variable of the output-impacting variable category occurring on the left side of a statement; generate the state transition slice by computing a union of each computed backward slice; etc.

Moreover, the at least one processor 910 can also execute instructions 930-990 to: collect a plurality of condition statements from each execution path; determine a condition conjunction of the plurality of condition statements; derive a value for a packet-matching field in the match-action table based on an intersection of the condition conjunction and variables of a packet variable category; derive a value for a state-matching field in the match-action table based on an intersection of the condition conjunction and variables of an output-impacting state variable category; derive a value for a packet-action field in the match-action table based on an intersection of an execution path and the packet processing slice; derive a value for a state-action field in the match-action table based on an intersection of the execution path and the state transition slice; identify a forwarding action in a section of source code associated with a network function provided by a middlebox in a network; combine a packet processing slide and a state transition slice into a plurality of execution paths; model a middlebox by filling field values in a match-action table representing packet processing model for the middlebox using the plurality of execution paths; parse source codes associated with a network function provided by a middlebox in a network; identify a forwarding action on a packet traversing the middlebox from the source codes; extract at least a packet processing slice and a state transition slice from the source codes; generate a plurality of execution paths by combining the packet processing slide and the state transition slice; model a middlebox by inserting the plurality of execution path as field values in a match-action table representing packet processing model for the middlebox; determine whether the forwarding action exists in the source codes; perform a drop action in response to no forwarding action existing in the source codes; etc.

The machine-readable storage medium and/or memory 920 includes instructions 930-990 for the processor 910 to fetch, decode, and execute. In another example, the machine-readable storage medium and/or memory 920 may be an electronic, magnetic, optical, memory, storage, flash-drive, or other physical device that contains or stores executable instructions. Thus, the machine-readable storage medium 920 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium and/or memory 920 may include an application and/or firmware which can be utilized independently and/or in conjunction with the at least one processor 910 to fetch, decode, and/or execute instructions of the machine-readable storage medium and/or memory 920. The application and/or firmware may be stored on the machine-readable storage medium and/or memory 920 and/or stored on another location of the network device 900.

We claim:

1. A method comprising:
    parsing, by a network device, a section of source code associated with a network function provided by a middlebox in a network;
    extracting, by the network device, a packet processing slice and a state transition slice from the section of source code by:
        extracting a plurality of variables from the set of source code;
        categorizing the plurality of variables into a plurality of categories that comprise a packet variable category, an output-impacting state variable category, and a configurations variable category; and
        iterating through a plurality of statements in the section of source code;
        computing a backward slice to update a state for each variable of the output-impacting variable category occurring on the left side of a statement; and
        generating the state transition slice by computing a union of each computed backward slice;
    generating, by the network device, a plurality of execution paths from the packet processing slice and the state transition slice; and
    modeling the middlebox by inserting, by the network device, the plurality of execution paths to a match-action table that describes a packet processing model for the middlebox.

2. The method of claim 1, wherein extracting the packet processing slice and the state transition slice further comprises:
    receiving a packet output function as an input;
    performing a backward slicing on the set of source code to obtain a plurality of slices; and generating the packet processing slice by computing a union of the plurality of the slices.

3. The method of claim 1, wherein the plurality of execution paths are generated using symbolic execution from the packet processing slice and the state transition slice.

4. The method of claim 1, further comprising:
collecting a plurality of condition statements from each execution path;
determining a condition conjunction of the plurality of condition statements;
deriving a value for a packet-matching field in the match-action table based on an intersection of the condition conjunction and variables of a packet variable category; and
deriving a value for a state-matching field in the match-action table based on an intersection of the condition conjunction and variables of an output-impacting state variable category.

5. The method of claim 1, further comprising:
deriving a value for a packet-action field in the match-action table based on an intersection of an execution path and the packet processing slice; and
deriving a value for a state-action field in the match-action table based on an intersection of the execution path and the state transition slice.

6. The method of claim 1, wherein parsing the section of source code further comprising: parsing the section of source code to identify at least one function indicating an action on a packet passing through the middlebox.

7. The method of claim 6, wherein the at least one function indicating the action comprises a send function, a receive function, a select function, a read function, and a bind function.

8. A system comprising at least a memory and a processor coupled to the memory, the processor executing instructions stored in the memory to:
identify a forwarding action in a section of source code associated with a network function provided by a middlebox in a network;
extract a packet processing slice and a state transition slice from the section of source code at least by: extracting a plurality of variables from the set of source code; and categorizing the plurality of variables into a plurality of categories that comprise a packet variable category, an output-impacting state variable category, and a configurations variable category;
identify each variable of the output-impacting variable category in the section of source code;
compute a backward slice to update a state for the each variable of the output-impacting variable category occurring on the left side of a statement;
generate the state transition slice by computing a union of each computed backward slice;
combine the packet processing slide and the state transition slice into a plurality of execution paths; and
model the middlebox by filling field values in a match-action table representing packet processing model for the middlebox using the plurality of execution paths.

9. The system of claim 8, wherein the processor further executes instructions stored in the memory to:
receive a packet output function as an input;
perform a backward slicing on the set of source code to obtain a plurality of slices; and
generate the packet processing slice by computing a union of the plurality of the slices.

10. The system of claim 8, wherein the processor further executes instructions stored in the memory to parse another section of source code in a library that is associated with the section of source code, wherein the library is not a part of the section of source code.

11. The system of claim 8, wherein a code structure corresponding to the section of source code corresponds to a single loop format.

12. The system of claim 8, wherein a code structure corresponding to the section of source code corresponds to a nested loop format, and wherein the processor further executes instructions stored in the memory to transform the section of source code from the nested loop format to a single loop format.

13. A non-transitory machine-readable storage medium encoded with instructions executable by at least one processor of a network device, the machine-readable storage medium comprising instructions to:
parse source codes associated with a network function provided by a middlebox in a network;
identify a forwarding action on a packet traversing the middlebox from the source codes;
extract at least a packet processing slice and a state transition slice from the source codes at least by: extracting a plurality of variables from the set of source code; and categorizing the plurality of variables into a plurality of categories that comprise a packet variable category, an output-impacting state variable category, and a configurations variable category;
identify each variable of the output-impacting variable category in the section of source code;
compute a backward slice to update a state for the each variable of the output-impacting variable category occurring on the left side of a statement;
generate the state transition slice by computing a union of each computed backward slice;
generate a plurality of execution paths by combining the packet processing slide and the state transition slice; and
model the middlebox by inserting the plurality of execution path as field values in a match-action table representing packet processing model for the middlebox.

14. The non-transitory machine-readable storage medium of claim 13, wherein the machine-readable storage medium further comprises instructions to:
receive a packet output function as an input;
perform a backward slicing on the set of source code to obtain a plurality of slices; and
generate the packet processing slice by computing a union of the plurality of the slices.

15. The non-transitory machine-readable storage medium of claim 13, wherein the default forwarding action comprises a drop action.

16. The non-transitory machine-readable storage medium of claim 13, wherein the machine-readable storage medium further comprises instructions to:
determine whether the forwarding action exists in the source codes; and
in response to no forwarding action existing in the source codes, performing a drop action.

* * * * *